United States Patent
Skvortsov et al.

(10) Patent No.: US 11,481,489 B2
(45) Date of Patent: Oct. 25, 2022

(54) SYSTEM AND METHOD FOR GENERATING A REPRESENTATION OF A WEB RESOURCE TO DETECT MALICIOUS MODIFICATIONS OF THE WEB RESOURCE

(71) Applicant: AO Kaspersky Lab, Moscow (RU)

(72) Inventors: Vladimir A. Skvortsov, Moscow (RU); Evgeny B. Kolotinsky, Moscow (RU)

(73) Assignee: AO Kaspersky Lab, Moscow (RU)

(*) Notice: Subject to any disclaimer, the term of this patent is extended or adjusted under 35 U.S.C. 154(b) by 98 days.

(21) Appl. No.: 16/951,014

(22) Filed: Nov. 18, 2020

(65) Prior Publication Data
US 2021/0073384 A1    Mar. 11, 2021

Related U.S. Application Data

(63) Continuation of application No. 16/128,703, filed on Sep. 12, 2018, now Pat. No. 10,878,095.

(30) Foreign Application Priority Data

Mar. 30, 2018  (RU) .......................... RU2018111479

(51) Int. Cl.
  *G06F 21/55*    (2013.01)
  *G06F 21/57*    (2013.01)
  (Continued)

(52) U.S. Cl.
  CPC ........ *G06F 21/554* (2013.01); *G06F 16/2365* (2019.01); *G06F 16/56* (2019.01);
  (Continued)

(58) Field of Classification Search
  CPC ........ G06F 21/57; G06F 21/554; G06F 16/56; G06F 16/2365; G06F 40/14;
  (Continued)

(56) References Cited

U.S. PATENT DOCUMENTS 8,677,481 B1*  3/2014  Lee ..................... H04L 63/1416
                                              726/22
2016/0352772 A1*  12/2016  O'Connor ........... H04L 63/1483

OTHER PUBLICATIONS

Liu, et al. (Computer English Translation of Chinese Patent No. CN 106599242A), pp. 1-11. (Year: 2017).*

* cited by examiner

*Primary Examiner* — Daniel G Mariam
(74) *Attorney, Agent, or Firm* — ArentFox Schiff LLP; Michael Fainberg (57) ABSTRACT

The present disclosure provides for systems and methods for generating an image of a web resource to detect a modification of the web resource. An exemplary method includes selecting one or more objects of the web resource based on one or more object attributes; identifying a plurality of tokens for each selected object based on contents of the selected object; calculating a hash signature for each selected object of the web resource using the identified plurality of tokens; identifying potentially malicious calls within the identified plurality of tokens; generating an image of the web resource based on the plurality of hash signatures and based on the identified potentially malicious calls, wherein the image of the web resource comprises a vector representation of the contents of the web resource; and detecting whether the web resource is modified based on the image of the web resource.

20 Claims, 3 Drawing Sheets

(51) Int. Cl.
*G06K 9/62* (2022.01)
*G06N 7/00* (2006.01)
*G06F 16/56* (2019.01)
*G06F 16/23* (2019.01)
*G06F 40/143* (2020.01)
*G06F 40/14* (2020.01)
*G06V 30/40* (2022.01)
*G06V 10/778* (2022.01)

(52) U.S. Cl.
CPC .............. *G06F 21/57* (2013.01); *G06F 40/14* (2020.01); *G06F 40/143* (2020.01); *G06K 9/6262* (2013.01); *G06N 7/005* (2013.01); *G06V 10/778* (2022.01); *G06V 30/40* (2022.01); *G06F 2221/034* (2013.01)

(58) Field of Classification Search
CPC . G06F 40/143; G06F 2221/034; G06V 30/40; G06V 10/778; G06N 7/005; G06K 9/6262
See application file for complete search history.

SYSTEM AND METHOD FOR GENERATING A REPRESENTATION OF A WEB RESOURCE TO DETECT MALICIOUS MODIFICATIONS OF THE WEB RESOURCE

CROSS-REFERENCE TO RELATED APPLICATIONS

This application is a continuation of prior U.S. patent application Ser. No. 16/128,703, filed Sep. 12, 2018, which claims benefit of priority under 35 U.S.C. 119(a)-(d) to a Russian Application No. 2018111479 filed on Mar. 30, 2018, the entire contents of each of which are incorporated herein by reference.

FIELD OF TECHNOLOGY

The present disclosure relates to antivirus technologies, and more specifically to systems and methods for generating a representation of a web resource to detect malicious modifications of web resources.

BACKGROUND

Personal computers, notebooks, tablets, smartphones, and the like have gained widespread use within recent decades. This widespread use has become a powerful incentive to the use of such devices in various areas of activity and to solve a varied number of problems (from Internet surfing to bank transfers and managing electronic documentation). In parallel with the growth in the number of computing devices and software running on these devices, the number of malicious programs has grown proportionally.

At present, there are an innumerable amount of malicious programs being spread across various networks and other malicious programs being developed. Some of these malicious programs steal personal and confidential information from the devices of users (such as logins and passwords, banking information, electronic documents). Others turn the devices of users into so-called botnets for attacks such as distributed denial of service (DDOS) attacks, or to sort through passwords by the brute force method on other computers or computer networks. Still others propose paid content to users through intrusive advertising, paid subscriptions, sending of SMS to toll numbers, and so on.

The methods of embedding malicious programs into the computers of users also vary. Some are downloaded and installed on servers or clients (the computers of users) covertly (such as by using vulnerabilities of the software) or openly (for example, using social engineering technologies by the efforts of the users themselves). Others embed themselves into data being transmitted between servers and clients that is intercepted by a third party.

Web resources (bank sites, results of queries to servers, and so forth) are some of the popular objects of attack of malicious programs, the target of the attack being confidential user data (logins and passwords, account numbers, etc.), computing resources (used for attacks on other computers, such as participating in DDOS attacks, unauthorized computations, such as mining crypto currencies, and so on), and so forth. The activity of the described attacks starts with the substitution of data being transmitted between servers and clients (for example, the substitution of the content of a personal bank account by a fake personal account, the embedding of malicious scripts, and so on).

The primary element in the fight against the described forms of attack is the determination of a modification of the data of web resources that is being transmitted, for which various technologies are used, including:

signature analysis, by which one tries to determine modifications of web resources on the basis of a comparison with predetermined templates of web resources;

heuristic analysis, by which one tries to determine modifications of web resources on the basis of checking for the fulfillment of previously specified rules of formation of web resources;

black and white lists, by which one tries to determine insertions of links and addresses into web resources.

The present disclosure describes systems and methods which, in one aspect, may detect unknown modifications of web sites. Often, in known analysis technologies, personal user data may be sent from clients to servers (which may be contained in elements of the web sites). Such a data transfer is potentially vulnerable and might be considered unlawful by the legislation of some countries.

The present disclosure describes systems and methods for detecting modification of a web resource.

SUMMARY

The present disclosure describes methods and systems for providing information security. According to one aspect of the disclosure, a technical result achieved in determining that a web resource was modified by analyzing a generated image of the web resource.

An exemplary method includes selecting one or more objects of the web resource based on one or more object attributes; identifying a plurality of tokens for each selected object based on contents of the selected object; calculating a hash signature for each selected object of the web resource using the identified plurality of tokens; identifying potentially malicious calls within the identified plurality of tokens; generating an image of the web resource based on the plurality of hash signatures and based on the identified potentially malicious calls, wherein the image of the web resource comprises a vector representation of the contents of the web resource; and detecting whether the web resource is modified based on the image of the web resource.

In yet another aspect, calculating the hash signature further includes: converting the generated plurality of tokens into a plurality of n-grams; and applying a hash function to each of the plurality of n-grams to generate the hash signature, wherein the hash signature includes an array of numbers of a predefined length.

In another aspect, each of the plurality of n-grams has a predefined length and a predefined overlap.

In yet another aspect, the plurality of tokens are identified using one or more token separators.

In another aspect, the hash function comprises at least one of fuzzy hash or locality-sensitive hash (LSH).

In yet another aspect, one or more objects are selected based on analysis of the web resource and wherein the analysis of the web resource is performed during an online session, during which the web resource is executed.

In another aspect, the analysis of the web resource includes analysis of HTML code describing a structure and content of the web resource.

In another aspect, the web resource includes an embedded script for verifying the integrity of the web resource.

In another aspect, a system is disclosed for generating an image of a web resource to detect a modification of the web resource, comprising a hardware processor configured to: select one or more objects of the web resource based on one or more object attributes; identify a plurality of tokens for each selected object based on contents of the selected object; calculate a hash signature for each selected object of the web resource using the identified plurality of tokens; identify potentially malicious calls within the identified plurality of tokens; generate an image of the web resource based on the plurality of hash signatures and based on the identified potentially malicious calls, wherein the image of the web resource comprises a vector representation of the contents of the web resource; and detect whether the web resource is modified based on the image of the web resource.

In another aspect, disclosed a non-transitory computer-readable medium, storing instructions thereon for generating an image of a web resource to detect a modification of the web resource according to the aspects of systems and methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for detecting modification of web resources. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
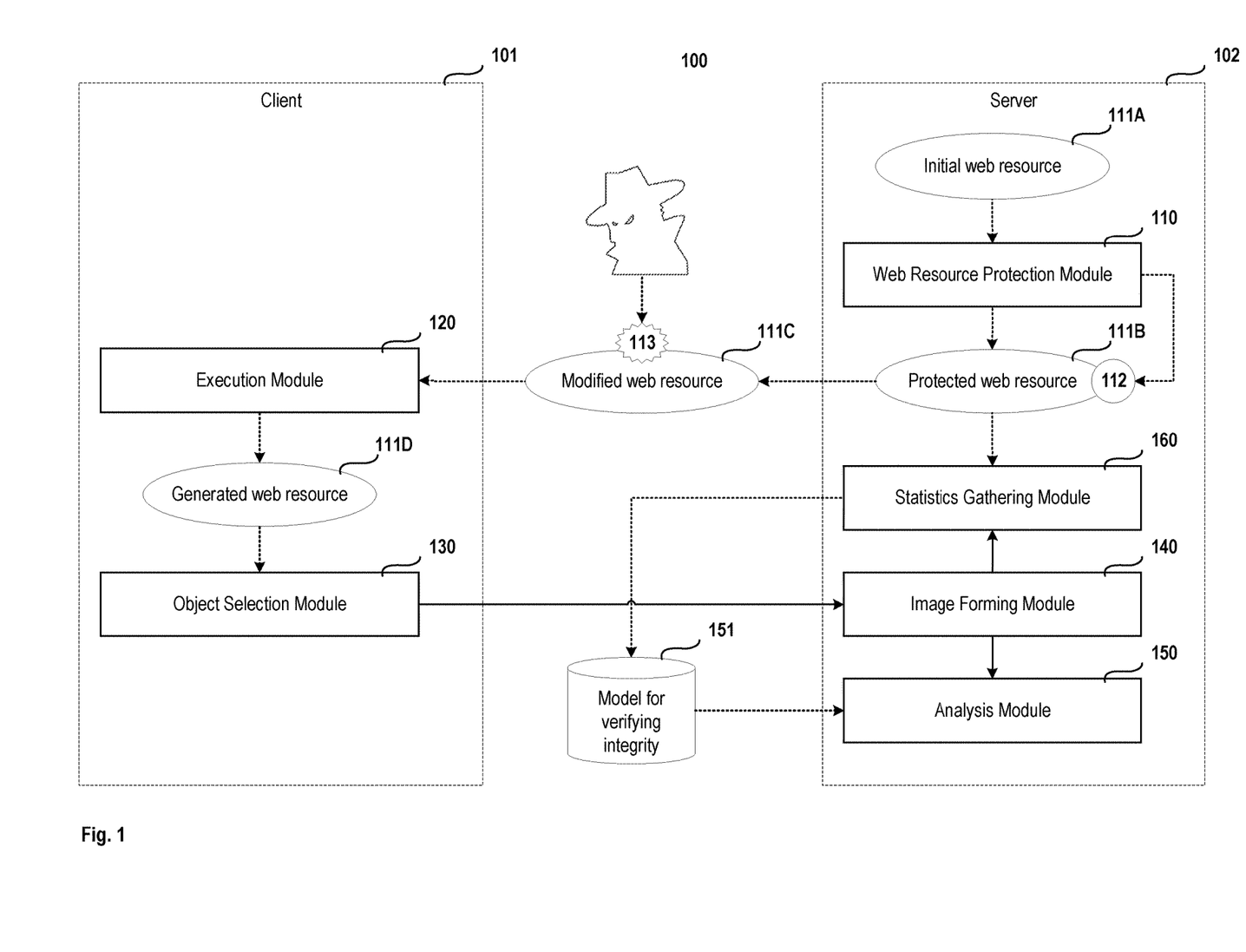
FIG. 1 shows an example of the structural diagram of the system of detecting a modification of a web resource.

FIG. 1 is a block diagram of a system 100 for detecting a modification of a web resource, in accordance with exemplary aspects of the present disclosure.

The system 100 may comprise a client 101, a server 102, a web resource 111 (which may represent one or more web objects, comprising at least an initial web resource 111A, a protected web resource 111B, a modified web resource 111C, and a generated web resource 111D), a script for verifying the integrity of the web resource 112, the modified data of the web resource 113, a web resource protection module 110, an execution module 120, an object selection module 130, an image forming module 140, an analysis module 150, a model for verifying the integrity 151, and a statistics gathering module 160.

In one exemplary aspect, the system 100 is modeled on a client-server architecture, wherein execution module 120 and the object selection module 130 function on the client 101 side while the web resource protection module 110, the image forming module 140, the analysis module 150 and the statistics gathering module 160 function on the server side 102.

For example, the client 101 might be a computer or a mobile device of a user running a browser. The user may be viewing a page of the personal user account using the browser, where the code of the page has been downloaded from a bank server 102.

In yet another exemplary aspect, the web resource 111 is an Internet site containing at least one page, the page containing at least:
HTML code containing objects of the web resource;
multimedia resources stored on the server 102 (for example, links to images, audio and video files, or images, audio and video files written directly on the page in the form url('data:image/png;base64, . . . '));
files of scripts;
style sheet files (CSS, Cascading Style Sheets).

For example, the page displaying the personal user account information contains HTML code describing the structure and content of the page, images associated with the personal user account (such as the bank logo), JavaScript scripts verifying and validating form entry, and so forth.

In yet another exemplary aspect, the objects of the web resource 111 are at least:
contained in the web resource 111 (for example, in the initial web resource 111A);
contained during execution of the web resource 111 (for example, the generated web resource 111D).

For example, the initial web resource 111A may contain a script responsible for forming the elements of the page (such as a form), and upon execution of the generated web resource 111D the generated forms may be present in the document object model (DOM) associated with a web page displayed by a web browser loaded in the RAM of the client 101.

In yet another exemplary aspect, the objects of the web resource 111 comprise at least:
scripts;
forms;
HTML data;
XHR requests (XMLHttpRequest);
DOM events.

Scripts may be written in any scripting language, for example, JavaScript, or the like. In yet another exemplary aspect, working with the web resource 111 occurs as follows:
the initial web resource 111A, which is safe and does not contain any malicious modifications, is initially formed on the server 102;
then the protected web resource 111B is formed; a script is generated for verifying the integrity of the web resource 112 and the script is embedded in the initial web resource 111A;
the protected web resource 111B is then sent for execution to the client 101, whereupon during any one of the following steps:
the sending of the protected web resource 111B from the server 102 to the client 101;
the execution of the protected web resource 111B on the client 101;

there occurs a modification of the web resource by a malicious application, as a result of which some of the data 113 of the protected web resource 111B is modified, thereby forming the modified web resource 111C;

the generated web resource 111D is then formed, for which the modified web resource 111C is executed.

The system 100 may determine whether the initial web resource 111A has been modified on the basis of an analysis of the generated web resource 111D.

The web resource protection module 110 is designed to:

generate, on the basis of data about the structure and contents of the web resource 111, a script for verifying the integrity of the web resource 112, wherein the script for verifying the integrity of the web resource 112 involves a determination of the characteristics of the objects of that web resource 111;

embed the generated script for verifying the integrity of the web resource 112 in that web resource 111.

In one exemplary aspect, the characteristics of the object of the web resource 111 are at least:

one or more parameters describing the object of the web resource 111 among the set of all objects of that web resource 111;

a rule of formation of the convolution of the object of the web resource 111;

a convolution of the object of the web resource 111.

In yet another exemplary aspect, the convolution of the object of the web resource 111 includes at least:

the convolution of parameters describing the object of the web resource 111;

the convolution of data contained in the object of the web resource 111.

In yet another exemplary aspect, the script for verifying the integrity of the web resource 112 is an ECMAScript script (for example, a script written in the JavaScript language).

In yet another exemplary aspect, the script for verifying the integrity of the web resource 112 is an extension for a browser which executes the corresponding web resource.

In yet another exemplary aspect, the script for verifying the integrity of the web resource 112 is generated in advance (before the analysis of the web resource 111), and during the analysis of the web resource 111 the initial parameters are generated for the working of the script for verifying the integrity of the web resource 112, while the script for verifying the integrity of the web resource 112 itself may be the same for different web resources.

The execution module 120 is designed to execute the web resource 111.

In one exemplary aspect, the execution of the web resource 111 involves at least:

the execution of the script for verifying the integrity of the web resource 112 that was embedded in that web resource 111;

analysis of the web resource 111:

interpreting of the web resource 111;

visualization of the web resource 111.

In yet another exemplary aspect, the execution of the web resource is performed by the browser working on the client 101, or by any given application using the data of the web resource and able to run the script for verifying the integrity of the web resource 112 that was embedded in that web resource.

The object selection module 130 is designed to:

determine the convolution of at least one object of the web resource 111, the convolution (performed as described elsewhere in this disclosure) being determined in order to run the script for verifying the integrity of the web resource 112 that was embedded in that web resource 111;

send the calculated convolutions to the image forming module 140.

In one exemplary aspect, the object selection module 130 may select at least one object from the web resource 111, the selection of the object from the web resource 111 being done during the execution of the script for verifying the integrity of the web resource 112 that was embedded in that web resource 111.

In yet another exemplary aspect, the convolution of the object of the web resource is at least:

a fuzzy hash;

a locality-sensitive hashing (LHS).

For example, the fuzzy hash can be constructed for any given text singled out from the web object, where the text might be:

a JavaScript script extracted from the "innerHTML" attributes of the tag "script";

a JavaScript script downloaded by an AJAX request at the network address of the network resource (URL) of the script;

a JavaScript script obtained by the call "toString( )" in a function which is transmitted in setInterval;

the HTML representation of a DOM element from the "outerHTML" attribute;

the current download page via an additional AJAX request.

The algorithm for constructing the hash is parametrized by the length of the n-gram and the overlap:

the text is broken up into n-grams by words of a given length and overlap;

for each n-gram the CRC32 is constructed;

the resulting array of whole numbers is processed by a universal hash function.

At the output an array of 32, 64 or 128 numbers is obtained, depending on the set of coefficients.

In one exemplary aspect of the hash function, its formula has the form:

$$h(x)=(ax+b) \bmod c$$

In yet another exemplary aspect, each type of object from the web resource 111 is analyzed by an individual method different from the methods used to analyze other types of objects.

For example, when analyzing web scripts (such as a JavaScript script) a method is used to find malicious scripts, as well as scripts which are not typical of bank pages:

a script is selected if it contains the attribute "src";

the selected scripts, where the attribute "src" is the data-url, are interpreted as inline scripts (for this, the data-url is first decoded).

For example:

data:text/javascript;base64,
aWYoImh0dHBzOiI9PT13aW5kb3cubG9jYXRp-
b24uc
HJvdG9jb2wpe3ZhciBzY3JpcHQgPSBkb2N1bW-
VudC5jcmVhdGVFbGVtZW50K CJzY3JpcH
QiKTtzY3JpcHQuc3JjID0gImh0dHBzOi8vcGxhZ-
mYtZ28ucnUvbGluay9sNW11YW w0MS8
iO2RvY3VtZW50LmdldEVsZW1lbnRzQnlUYW-
dOYW1lKCJoZWFkIilbMF0uYX BwZW5kQ2hp
bGQoc2NyaXB0KTt9 several representations of JavaScript are used:

the script is broken up into strings by the line break separator [\r\n];

the script is broken up into tokens;

For breaking up the script into tokens, token separators known from the prior art are used (such as "\r\n\t").
  the script is broken up into symbols;
  from the tokens, the hash signature is constructed with parameters for the construction of the n-grams:
    length—11 tokens,
    overlap—4 tokens,
  from the strings of the script the hash signature is constructed with parameters for the construction of the n-grams:
    length—7 strings,
    overlap—3 strings,
  lists of malicious calls of a scripting language are composed:
An example of a list of malicious script calls (specifically, JavaScript calls, though not limited thereto) is given below:

```
#1
eval              CreateObject      removeChild     parseInt
setTimeout        ActiveXObject     XMLHttpRequest  fromCharCode
setInterval       appendChild       XMLHTTP
#2
encodeURIComponent  decodeURIComponent  atob        btoa
``` a list of key words of JavaScript is composed;
For example, such words are the keys:
  ["break", "do", "instanceof", "typeof", "case", "else", "new", "var", "catch", "finally", "return", "function", "this", "with", "default", "if", "throw", "try", "abstract", "export", "interface", "static", "null", "true", "false"];
  the primary attributes are considered;
  for each potentially malicious call, the number of times it is encountered in the tokens is counted;
  the resulting data is built (for example, in JSON)
For example:

```
{
    "object_01": [
        [1958351, 5156809, ...],
        [565119, 357121, 150627, 39682, ...],
        [
        [5347, 5189, 16, 160497, 2412, ...],
        [8, 13, ...],
        [2, 0, 4, 7, 13, 0, ...]
        ]
    ],
    "object_02": [
        ["https://target-url",
        [1958351, 5156809, 679194, ...],
        [565119, 878958, ...],
        [
        [5347, 30.016270806059474, 1, ...],
        [8, 13, 1, ...],
        [2, 0, 4, 7, 13, 0, ...]
        ]
    ],
}
```

For example, for the analysis of XHR requests:
  the methods for executing XHR are intercepted: XMLHttpRequest.prototype.open, XMLHttpRequest.prototype.send;
  for each intercepted DOM level 3 call, the time, the type of event, the url, and the stack trace are recorded;
  the resulting data is built (for example, in JSON)

For example:

```
{
    "xhr": [
        [1498825034, "open", "https://sync.target-url.com/",
        {"stacktrace":"stacktrace"}],
        [1498825034, "send", "https:// sync.target-url.com/",
        {"stacktrace":"stacktrace"}],
    ],
}
```

Figure 2:
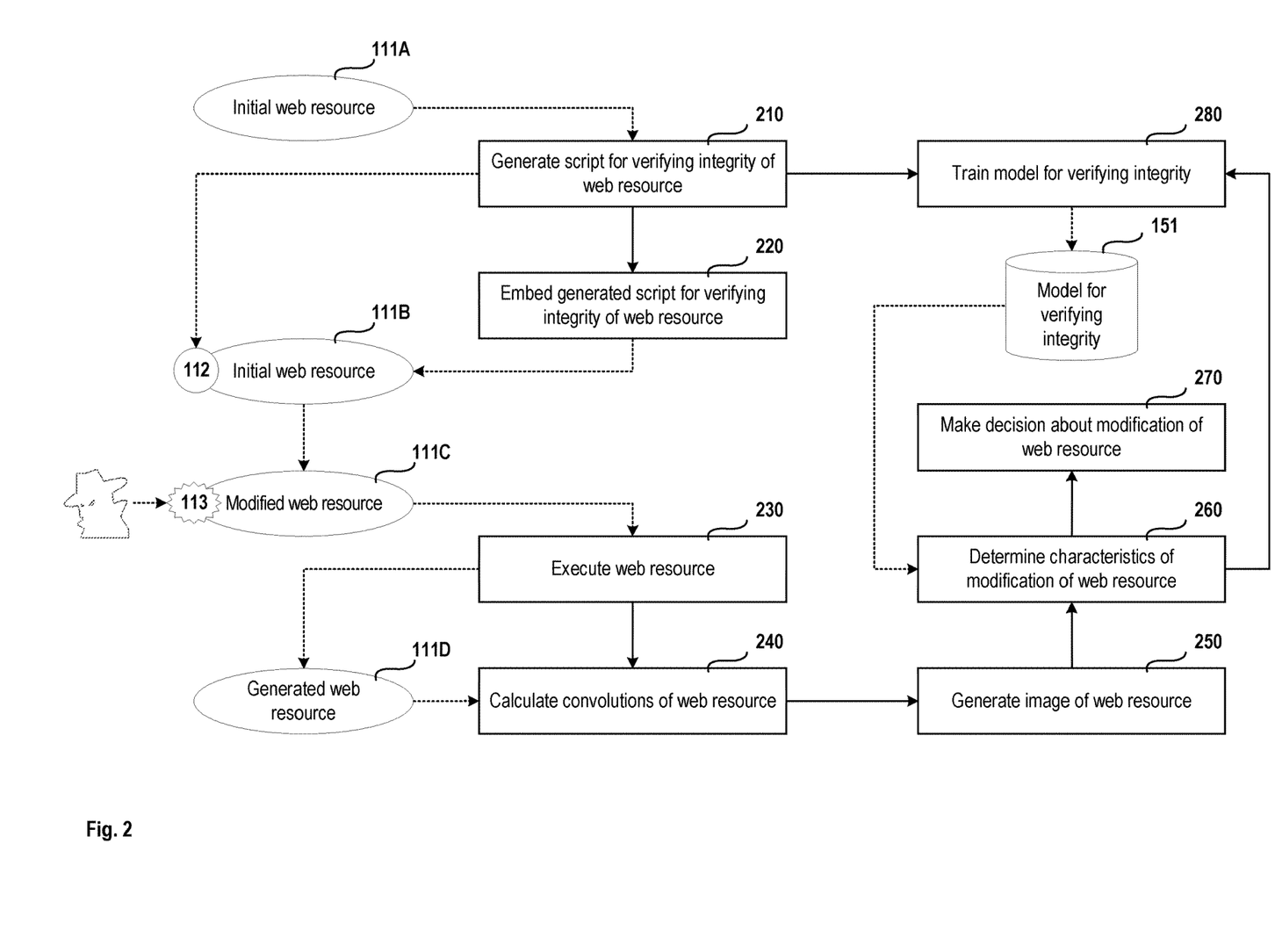
FIG. 2 shows an example of the structural diagram of the method of detecting a modification of a web resource.
Figure 3:
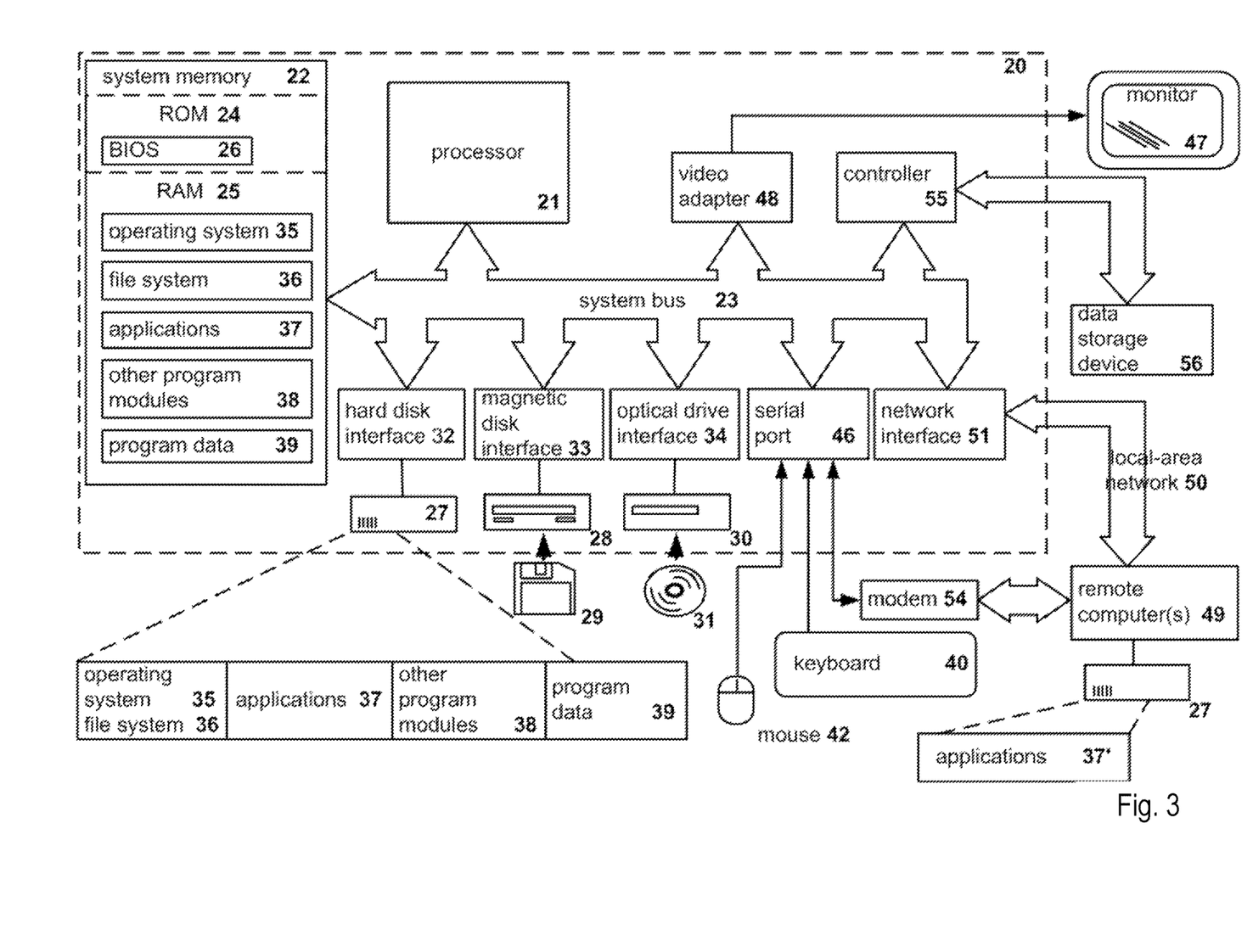
FIG. 3 shows an example of a general-purpose computer system, a personal computer or a server.

The image forming module 140 is designed to:
  generate the image of the web resource on the basis of the obtained convolutions, the image of the web resource being a vector representation of the contents of the web resource 111;
  send the generated image of the web resource to the analysis module 150.
The analysis module 150 is designed to:
  determine the characteristics of a modification 113 of a web resource 111 on the basis of the obtained image of the web resource with the use of a model for verifying the integrity 151, the model for verifying the integrity 151 being a set of rules for calculating the probability of a modification of the web resource 111;
  pronounce a decision as to the modification of the web resource 111 on the basis of the determined characteristics of the modification 113 of the web resource 111.
In one exemplary aspect, the characteristics of the modification 113 of the web resource 111 are at least:
  the probability that the web resource 111 has been modified, including at least:
    for previously specified groups of users of the web resource 111;
    for a specific user of the web resource 111;
  the parameters of the modification 113 of the web resource 111:
    the method of modification 113 of the web resource 111;
    the data used in the modification of the web resource 111.
In one exemplary aspect, the analysis of the web resource 111 is done during an online session, during which the mentioned web resource 111 is executed.
The statistics gathering module 160 may perform machine training of the model for verifying the integrity 151 on the basis of the image of the web resource generated at least from:
  previously analyzed web resources 111;
  the web resource 111 being analyzed prior to its being executed.
FIG. 2 shows an example of structural flow diagram of the method for detecting a modification of a web resource.
The method for detecting a modification of a web resource contains a step 210 in which a script for verifying the integrity of the web resource may be generated, a step 220 in which the generated script for verifying the integrity of the web resource may be embedded, a step 230 in which the web resource may be executed, a step 240 in which the convolutions of the web resource may be calculated, a step 250 in which the image of the web resource is generated, a step 260 in which the characteristics of the modification of the web resource may be determined, a step 270 in which a decision may be pronounced as to the modification of the web resource, and a step 280 in which the model for verifying the integrity may be trained.

In step 210, on the basis of data about the structure and content of the web resource 111, a script for verifying the integrity of the web resource 112, may be generated wherein the script for verifying the integrity of the web resource 112 is a description of the process of calculating characteristics of the objects of that web resource 111.

In step 220 the generated script for verifying the integrity of the web resource 112 may be embedded in that web resource 111.

In step 230 the web resource 111 may be executed. For this purpose, the web resource downloaded at the client side 101 is first analyzed (for example, a syntactical analysis is performed for the page), and based on the results thereof additional data is downloaded (for example, images are downloaded from the Internet at identified addresses), the scripts contained in the web resource are executed (for example, JavaScript scripts), the page elements are generated (such as forms), the web resource 111 being executed is visualized on the basis of the generated page elements, and furthermore data is additionally gathered in the process of execution of the web resource 111 (for example, events being created during the generating and utilization of the page elements are intercepted).

In step 240 at least one convolution of the web resource 111 may be calculated in accordance with the script for verifying the integrity of the web resource 112 that was embedded in the web resource 111.

In step 250 the image of the web resource may be generated on the basis of at least one calculated convolution, the image of the web resource being a vector representation of the content of the web resource 111.

In step 260 the characteristics of the modification 113 of the web resource 111 may be determined on the basis of the generated image of the web resource, making use of a trained model for verifying the integrity 151, wherein the model for verifying the integrity 151 is a set of rules for calculating the probability of a modification of the web resource 111.

In step 270 a decision is pronounced as to the modification of the web resource 111 on the basis of the determined characteristics of the modification 113 of the web resource 111.

In step 280 the model for verifying the integrity 151 may be trained on the basis of the image of the web resource generated at least on the basis of:
previously analyzed web resources 111;
the web resource 111 being analyzed prior to its being executed.

FIG. 4 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without parting from the inventive concepts disclosed herein.

What is claimed is:

1. A method for generating an image of a web resource to detect a modification of the web resource, the method comprising:
    selecting, by a processor, one or more objects of the web resource based on one or more object attributes;
    identifying, by the processor, a plurality of tokens for each selected object based on contents of the selected object;
    calculating, by the processor, a hash signature for each selected object of the web resource using the identified plurality of tokens;
    identifying, by the processor, potentially malicious calls within the identified plurality of tokens;
    generating, by the processor, an image of the web resource based on the plurality of hash signatures and based on the identified potentially malicious calls, wherein the image of the web resource comprises a vector representation of the contents of the web resource; and
    detecting, by the processor, whether the web resource is modified based on the image of the web resource.

2. The method of claim 1, wherein calculating the hash signature further comprises:
    converting, by the processor, the generated plurality of tokens into a plurality of n-grams; and
    applying, by the processor, a hash function to each of the plurality of n-grams to generate the hash signature, wherein the hash signature comprises an array of numbers of a predefined length.

3. The method of claim 2, wherein each of the plurality of n-grams has a predefined length and a predefined overlap.

4. The method of claim 2, wherein the hash function comprises at least one of fuzzy hash or locality-sensitive hash (LSH).

5. The method of claim 1, wherein the plurality of tokens are identified using one or more token separators.

6. The method of claim 1, wherein one or more objects are selected based on analysis of the web resource and wherein the analysis of the web resource is performed during an online session, during which the web resource is executed.

7. The method of claim 1, wherein the analysis of the web resource includes analysis of HTML code describing a structure and content of the web resource.

8. The method of claim 1, wherein the web resource includes an embedded script for verifying the integrity of the web resource.

9. A system for generating an image of a web resource to detect a modification of the web resource, the system comprising:
    a hardware processor configured to:
        select one or more objects of the web resource based on one or more object attributes;
        identify a plurality of tokens for each selected object based on contents of the selected object;
        calculate a hash signature for each selected object of the web resource using the identified plurality of tokens;
        identify potentially malicious calls within the identified plurality of tokens;
        generate an image of the web resource based on the plurality of hash signatures and based on the identified potentially malicious calls, wherein the image of the web resource comprises a vector representation of the contents of the web resource; and detect whether the web resource is modified based on the image of the web resource.

10. The system of claim 9, wherein the hardware processor configured to calculate the hash signature is further configured to:
   convert the generated plurality of tokens into a plurality of n-grams; and
   apply a hash function to each of the plurality of n-grams to generate the hash signature, wherein the hash signature comprises an array of numbers of a predefined length.

11. The system of claim 10, wherein each of the plurality of n-grams has a predefined length and a predefined overlap.

12. The system of claim 10, wherein the hash function comprises at least one of fuzzy hash or locality-sensitive hash (LSH).

13. The system of claim 9, wherein each of the plurality of n-grams has a predefined length and a predefined overlap.

14. The system of claim 9, wherein one or more objects are selected based on analysis of the web resource and wherein the analysis of the web resource is performed during an online session, during which the web resource is executed.

15. The system of claim 9, wherein the analysis of the web resource includes analysis of HTML code describing a structure and content of the web resource.

16. The system of claim 9, wherein the web resource includes an embedded script for verifying the integrity of the web resource.

17. A non-transitory computer-readable medium, storing instructions thereon for generating an image of a web resource to detect a modification of the web resource, including instructions for:
   selecting one or more objects of the web resource based on one or more object attributes;
   identifying a plurality of tokens for each selected object based on contents of the selected object;
   calculating a hash signature for each selected object of the web resource using the identified plurality of tokens;
   identifying potentially malicious calls within the identified plurality of tokens;
   generating an image of the web resource based on the plurality of hash signatures and based on the identified potentially malicious calls, wherein the image of the web resource comprises a vector representation of the contents of the web resource; and
   detecting whether the web resource is modified based on the image of the web resource.

18. The non-transitory computer-readable medium of claim 17, wherein the instructions for calculating the hash signature further comprise instructions for:
   converting the generated plurality of tokens into a plurality of n-grams; and
   applying a hash function to each of the plurality of n-grams to generate the hash signature, wherein the hash signature comprises an array of numbers of a predefined length.

19. The non-transitory computer-readable medium of claim 18, wherein each of the plurality of n-grams has a predefined length and a predefined overlap.

20. The non-transitory computer-readable medium of claim 17, wherein the plurality of tokens are identified using one or more token separators.

* * * * *